(12) United States Patent
Honda et al.

(10) Patent No.: US 11,353,880 B2
(45) Date of Patent: Jun. 7, 2022

(54) AUTONOMOUS MOVING BODY AND CONTROL PROGRAM FOR AUTONOMOUS MOVING BODY

(71) Applicant: TOYOTA JIDOSHA KABUSHIKI KAISHA, Toyota (JP)

(72) Inventors: Daisaku Honda, Kasugai (JP); Tetsuya Taira, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 207 days.

(21) Appl. No.: 16/410,012

(22) Filed: May 13, 2019

(65) Prior Publication Data

US 2019/0384307 A1 Dec. 19, 2019

(30) Foreign Application Priority Data

Jun. 15, 2018 (JP) .............................. JP2018-114575

(51) Int. Cl.
*G05D 1/02* (2020.01)
*B25J 9/16* (2006.01)
*G05D 1/00* (2006.01)

(52) U.S. Cl.
CPC .......... *G05D 1/0225* (2013.01); *B25J 9/1664* (2013.01); *G05D 1/0088* (2013.01); *G05D 1/0289* (2013.01); *G05D 2201/0203* (2013.01)

(58) Field of Classification Search
CPC ......... G05D 2201/0203; G05D 1/0289; G05D 1/0088; G05D 1/0225; G05D 1/028;
(Continued)

(56) References Cited

U.S. PATENT DOCUMENTS 10,037,696 B2 * 7/2018 Laur ...................... G05D 1/021
10,126,747 B1 * 11/2018 Svec ...................... G01C 21/20
(Continued)

FOREIGN PATENT DOCUMENTS

CN 106251016 A 12/2016
JP 5880498 B2 3/2016
(Continued)

OTHER PUBLICATIONS

Ping Dong et al., "AGV and AGVS Scheme Research", Combined Machine Tool and Automated Machining Technology, No. 2, pp. 21-24, Dec. 31, 2002.
(Continued)

*Primary Examiner* — Jeff A Burke
*Assistant Examiner* — Arslan Azhar
(74) *Attorney, Agent, or Firm* — Oliff PLC

(57) ABSTRACT

Provided is an autonomous moving body configured to move along a planned movement path, including: an external sensor configured to recognize another autonomous moving body and an operation state of the another autonomous moving body; a movement determination unit configured to determine, when it is predicted by the external sensor that the another autonomous moving body is positioned at a via point or a destination point of the own autonomous moving body at the same time that the own autonomous moving body is, whether to continue or suspend movement based on whether a task of the another autonomous moving body estimated from the operation state or a task of the own autonomous moving body has a higher priority; and a movement control unit configured to control a moving unit based on the determination of the movement determination unit.

3 Claims, 8 Drawing Sheets

(58) Field of Classification Search
CPC ... G05D 1/0011; G05D 1/0231; B25J 9/1664; G06K 7/10366; H04B 5/0056
See application file for complete search history.

(56) References Cited

U.S. PATENT DOCUMENTS

| | | | |
|---|---|---|---|
| 11,049,391 B2* | 6/2021 | Mintz | G08G 1/017 |
| 2015/0046018 A1 | 2/2015 | Hayashi et al. | |
| 2017/0124407 A1* | 5/2017 | Micks | G06K 9/00604 |
| 2017/0269597 A1 | 9/2017 | Maekawa | |
| 2017/0287331 A1 | 10/2017 | Laur et al. | |
| 2017/0316692 A1* | 11/2017 | Rusciolelli | A01B 79/005 |
| 2017/0369055 A1* | 12/2017 | Saigusa | G08G 1/0116 |
| 2018/0249872 A1* | 9/2018 | Park | A47L 9/2852 |
| 2019/0310655 A1* | 10/2019 | Voorhies | B66F 9/063 |

FOREIGN PATENT DOCUMENTS

| | | | |
|---|---|---|---|
| JP | 2017-174379 A | | 9/2017 |
| KR | 2018060339 A | * | 2/2018 |

OTHER PUBLICATIONS

Translation of Mar. 8, 2022 Office Action issued in Chinese Patent Application No. 201910505096.X.

* cited by examiner

TASK PRIORITY

| ORDER | TASK | PRIORITY DETERMINATION IN CASE WHERE SAME TASK IS EXECUTED |
|---|---|---|
| 1 | EMERGENCY TRAVELING | MOVING SPEED |
| 2 | CALLING COMMAND | GENERAL USER/SYSTEM ADMINISTRATOR |
| 3 | GUIDING TRAVELING | NUMBER OF PEOPLE TO GUIDE |
| 4 | CHARGE | REMAINING CAPACITY |
| 5 | OBJECT CONVEYANCE | SIZE OF OBJECT TO BE CONVEYED |
| 6 | RETURNING | NUMBER OF APPOINTED TASKS |

Fig. 6

AUTONOMOUS MOVING BODY AND CONTROL PROGRAM FOR AUTONOMOUS MOVING BODY

CROSS REFERENCE TO RELATED APPLICATIONS

This application is based upon and claims the benefit of priority from Japanese patent application No. 2018-114575, filed on Jun. 15, 2018, the disclosure of which is incorporated herein in its entirety by reference.

BACKGROUND

The present disclosure relates to an autonomous moving body and a control program for an autonomous moving body.

Techniques in which a plurality of autonomous moving robots respectively execute tasks under a specific environment have come to be known. For example, Japanese Unexamined Patent Application Publication No. 2017-174379 discloses a technique in which a plurality of cleaning robots perform cleaning while moving paths different from each other.

SUMMARY

When a plurality of moving bodies which move autonomously under a specific environment are controlled, for example, by a centralized server under a single system, or when they can communicate with each other by communication means in conformity with a common format, each one of the plurality of moving bodies can perform a smooth autonomous movement. However, in recent years, a situation where autonomous moving bodies which are independent of each other perform separate tasks under a specific environment has also become more common. Under such a situation, it is difficult for autonomous moving bodies to cooperate with each other to adjust movement paths, and thus a smooth autonomous movement is prevented.

The present disclosure provides an autonomous moving body and a control program therefor capable of efficiently executing a given task without these autonomous moving bodies colliding with each other at a via point or a destination point, even when they are not being controlled under a single system or not communicating with each other.

A first exemplary aspect is an autonomous moving body configured to move along a planned movement path, including: an external sensor configured to recognize another autonomous moving body and an operation state of the another autonomous moving body; a movement determination unit configured to determine, when it is predicted by the external sensor that the another autonomous moving body is positioned at a via point or a destination point of the own autonomous moving body at the same time that the own autonomous moving body is, whether to continue or suspend movement based on whether a task of the another autonomous moving body estimated from the operation state or a task of the own autonomous moving body has a higher priority; and a movement control unit configured to control a moving unit based on the determination of the movement determination unit.

As described above, since it is determined whether to continue or suspend movement based on whether a task of the another autonomous moving body estimated from the operation state or a task of the own autonomous moving body has a higher priority, it is possible to efficiently execute a given task, without these autonomous moving bodies being controlled under a single system, or without these autonomous moving bodies communicating with each other.

In the above-described autonomous moving body, the movement determination unit may determine whether to continue or suspend movement based on whether a charging task of the another autonomous moving body or a charging task of the own autonomous moving body when a destination point is a feeding point for supplying power to a rechargeable battery has a higher priority for charging. When tasks which are being executed by the own autonomous moving body and the another autonomous moving body are both charging tasks of performing a charging operation by moving to a feeding point, it is possible for each of the autonomous moving bodies to safely, reliably execute a charging task by performing adjustments such as comparing the respective remaining power capacities. Further, by doing the above, it is possible to perform a pseudo cooperative operation with the another autonomous moving body even when these autonomous moving bodies are not controlled under the same system.

In this case, the external sensor preferably reads remaining capacity information of power presented by a presentation unit of the another autonomous moving body, and the movement determination unit preferably determines whether the another autonomous moving body has a higher priority for charging than the own autonomous moving body based on the remaining capacity information. By using information displayed on the presentation unit of the another autonomous moving body as described above, it is possible to relatively easily acquire information on the another autonomous moving body including remaining capacity information of power.

Further, the above-described autonomous moving body may include a presentation unit configured to present information on a task of the own autonomous moving body to the another autonomous moving body. The another autonomous moving body recognizes the information on the own autonomous moving body by a presentation of the presentation unit so that it can be expected that the another autonomous moving body performs a movement operation in accordance with the recognized information.

Further, in the above-described autonomous moving body, the movement determination unit preferably determines to suspend movement when it is recognized that the another autonomous moving body is not an autonomous moving body of the same type as that of the own autonomous moving body. When it is not possible to determine what type of an autonomous moving body the another autonomous moving body is, it is sometimes difficult to accurately recognize the operation state based on external-appearance information acquired by the external sensor. By suspending movement when the another autonomous moving body is not an autonomous moving body of the same type as that of the own autonomous moving body, a higher level of safety can be achieved.

Further, the above-described autonomous moving body may further include a communication unit configured to perform intercommunication with the another autonomous moving body, and the movement control unit may be configured to control, while the intercommunication is established, the moving unit based on a communication result of the intercommunication regardless of the determination of the movement determination unit. When the intercommunication can be performed, a cooperative operation of the autonomous moving body with the another autonomous moving body may be performed using the communication.

It is safer for these autonomous moving bodies to communicate with each other and then determine each of the movement operations. On the other hand, even when the communication is not established, the autonomous moving body can perform a stable movement operation by the determination of the movement determination unit.

Another exemplary aspect is a control program for an autonomous moving body that moves along a planned movement path, the control program being adapted to cause a computer to perform: a recognition step of recognizing another autonomous moving body and an operation state of the another autonomous moving body by using an external sensor; a movement determination step of determining, when it is predicted by the recognition step that the another autonomous moving body is positioned at a via point or a destination point of the own autonomous moving body at the same time that the own autonomous moving body is, whether to continue or suspend movement based on whether a task of the another autonomous moving body estimated from the operation state has a higher priority than that of a task of the own autonomous moving body; and a movement control step of controlling a moving unit based on the determination of the movement determination step.

As described above, since it is determined whether to continue or suspend movement based on whether a task of the another autonomous moving body estimated from the operation state or a task of the own autonomous moving body has a higher priority, it is possible to efficiently execute a given task, without these autonomous moving bodies being controlled under a single system, or without these autonomous moving bodies communicating with each other.

According to the present disclosure, it is possible to provide an autonomous moving body and a control program therefor capable of efficiently executing a given task without these autonomous moving bodies colliding with each other at via point or a destination point, even when they are not being controlled under a single system or not communicating with each other.

The above and other objects, features and advantages of the present disclosure will become more fully understood from the detailed description given hereinbelow and the accompanying drawings which are given by way of illustration only, and thus are not to be considered as limiting the present disclosure.

BRIEF DESCRIPTION OF DRAWINGS

FIG. 6 is an example of a lookup table of a task priority;

DESCRIPTION OF EMBODIMENTS

Figure 1:
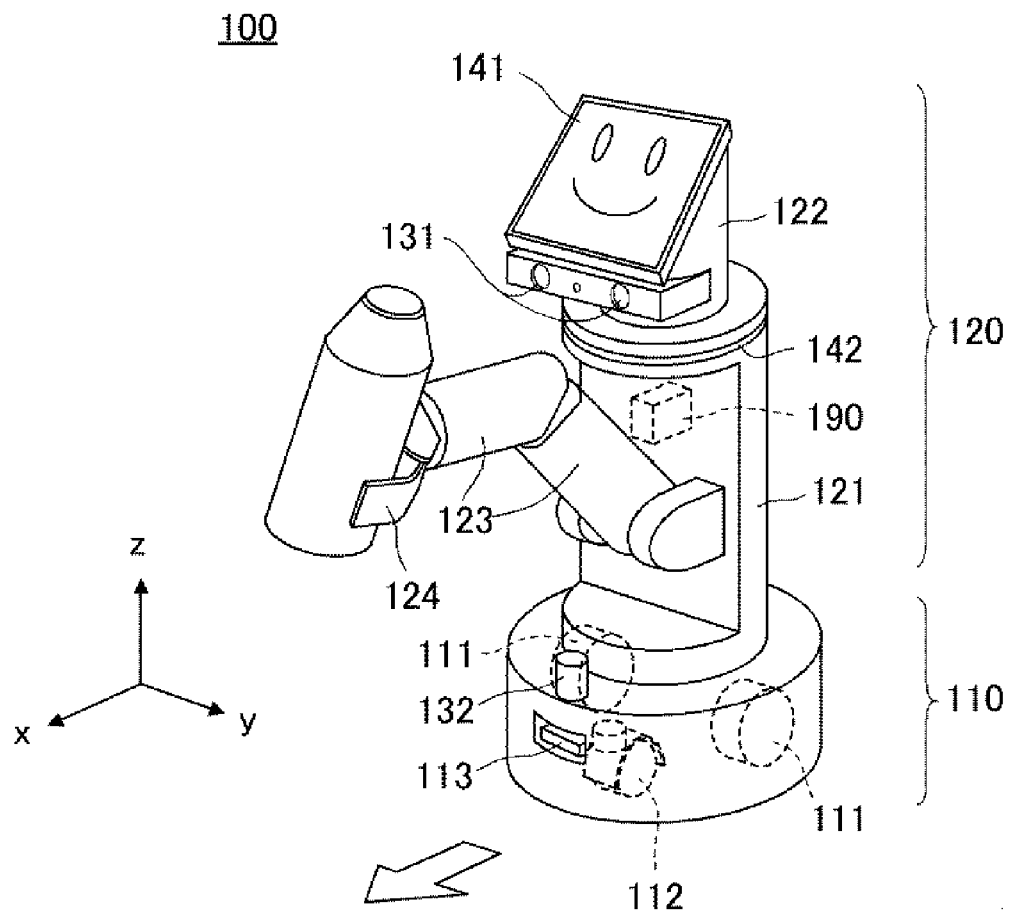
FIG. 1 is an external perspective view of a moving robot according to an embodiment.

FIG. 1 is an external perspective view of a moving robot 100 according to this embodiment. The moving robot 100 is an example of an autonomous moving body. The moving robot 100 is mainly composed of a carriage unit 110 and a main unit 120.

The carriage unit 110 supports two drive wheels 111 and one caster 112, each of which is grounded on a travel surface, in a cylindrical case. The two drive wheels 111 are disposed so that the centers of their rotation axes coincide with each other. Each drive wheel 111 is independently and rotationally driven by using a motor (not shown). The drive wheel 111 is an example of a moving unit for moving the moving robot. The caster 112 is a driven wheel and provided so that a rotating shaft extending in a vertical direction from the carriage unit 110 pivotally supports the wheel apart from the rotation axis of the wheel. Further, the caster 112 follows the carriage unit 110 in accordance with a moving direction thereof.

For example, the moving robot 100 goes straight when the two drive wheels 111 are rotated at the same speed in the same direction, and rotates around the vertical axis passing through the center of two drive wheels 111 of the carriage unit 110 when the two drive wheels 111 are rotated at the same speed in the reverse direction. That is, the moving robot 100 can move parallel to and rotate in a predetermined direction by controlling a turning direction and a turning speed of each of the two drive wheels 111.

The carriage unit 110 includes a laser scanner 132 on a peripheral part of the upper surface thereof. The laser scanner 132 scans a certain range in a horizontal surface for each step angle, and outputs whether or not there is an obstacle in each of the directions. Further, when there is an obstacle, the laser scanner 132 outputs a distance to the obstacle.

Further, the carriage unit 110 includes a power receiving terminal 113 on an outer circumferential surface thereof. The power receiving terminal 113 comes into contact with a power feed terminal, which will be described later, to receive power supplied therefrom. The moving robot 100 generates a charging task of moving to a feeding point, where the power feed terminal is located, to charge a rechargeable battery by coming into contact with the power receiving terminal 113 when the moving robot 100 detects that a power remaining capacity of the rechargeable battery mounted thereon falls below a reference value.

The main unit 120 mainly includes a body part 121 mounted on an upper surface of the carriage unit 110, a head part 122 placed on an upper surface of the body part 121, an arm 123 supported on a side surface of the body part 121, a hand 124 provided at a distal end of the arm 123, and an LED bar 142. The arm 123 and the hand 124 are driven by a motor (not shown), and grasp various objects in a controlled posture. FIG. 1 shows a state where the moving robot 100 grasps a container as an example of an object to be conveyed. The body part 121 can rotate around the vertical axis with respect to the carriage unit 110 by a driving force of the motor (not shown). Accordingly, the moving robot 100 can also move in a predetermined direction while maintaining a posture in which the grasping unit grasps an object to be conveyed and faces a specific direction.

The LED bar 142 is a light emitting device including a plurality of LEDs and light guide materials, and the LEDs are disposed on an annular outer peripheral part of the upper part of the body part 121 so that each of the LEDs emits light in the radial directions with respect to the vertical axis. The LED bar 142 can change a light emitting color and a blinking cycle, and this changing pattern makes it possible to present information on an operation state and a task of the moving robot 100 to the surroundings. Further, a control unit 190 is provided in the body part 121. The control unit 190 includes a control unit, a memory and the like, which will be described later.

The head part 122 mainly includes a stereo camera 131 and a display panel 141. The stereo camera 131 has a configuration in which two camera units having the same angle of view are disposed apart from each other, and it outputs images photographed by each of the camera units as image data.

The display panel 141 is, for example, a liquid-crystal panel, and displays a face of a character by illustration, or presents information on the moving robot 100 by using texts and icons. When the display panel 141 displays a face of a character, the impression that the display panel 141 is a dummy face can be given to surrounding observers. Further, the display panel 141 includes a touch panel on the display surface and can receive an input instruction from a user.

The head part 122 can rotate around the vertical axis with respect to the body part 121 by a driving force of the motor (not shown). Accordingly, the stereo camera 131 can photograph a target object present in a predetermined direction, and the display panel 141 can present a display content toward a predetermined direction. Note that in the following description, as shown in the drawings, a moving plane where the moving robot 100 moves is defined as an xy plane, and a vertical axis direction with respect to the moving plane is defined as a z-axis.

Figure 2:
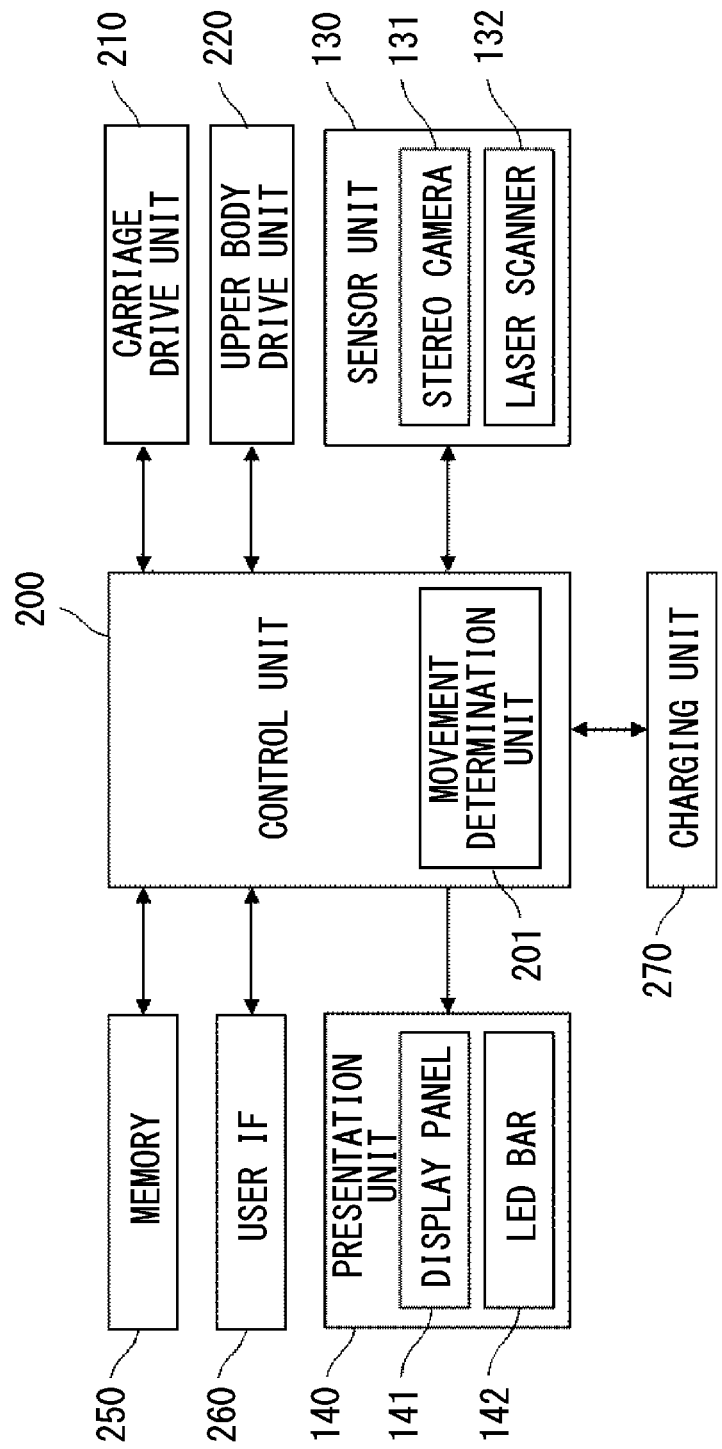
FIG. 2 is a control block diagram of the moving robot.

FIG. 2 is a control block diagram of the moving robot 100. A control unit 200, for example, is a CPU, and is housed in the control unit 190 of the main unit 120. A carriage drive unit 210 includes a drive circuit and a motor for driving the drive wheels 111. The control unit 200 sends a drive signal to the carriage drive unit 210 to control a rotation of the drive wheels 111. Further, the control unit 200 receives a feedback signal of an encoder or the like from the carriage drive unit 210, and recognizes a moving direction of the carriage. The carriage drive unit 210 functions as a movement control unit by cooperating with the control unit 200.

An upper body drive unit 220 includes a drive circuit and a motor for driving a grasping unit including an arm 123 and a hand 124, the body part 121, and the head part 122. The control unit 200 sends a drive signal to the upper body drive unit 220 to control grasping, and a rotation of the body part 121 and the head part 122. Further, the control unit 200 receives a feedback signal of an encoder or the like from the upper body drive unit 220, and recognizes a state of the grasping unit and directions of the body part 121 and the head part 122.

A sensor unit 130 includes various sensors for detecting, for example, another moving robot, an obstacle, a person present in the surrounding area, and a grasped object to be conveyed, and is disposed in the carriage unit 110 and the main unit 120 in a distributed manner. The stereo camera 131 and the laser scanner 132 are components constituting the sensor unit 130. The control unit 200 sends a control signal to the sensor unit 130 to drive various sensors, and then obtains output signals and output data from them. The control unit 200 analyzes these output signals and output data to recognize another moving robot 100, the operation state thereof, and the like. That is, the sensor unit 130 functions as an external sensor for recognizing another autonomous moving body, the operation state thereof, and the like by cooperating with the control unit 200.

A memory 250 is a nonvolatile storage medium, and for example, a solid state drive is used. The memory 250 stores various parameter values, functions, lookup tables, comparative image data and the like which are used for controlling the moving robot 100 in addition to a control program. The memory 250 may store an environmental map representing an environment in which the moving robot 100 moves autonomously.

A user IF 260 is an input unit for a user to input an instruction to the moving robot 100, and a touch panel superimposed in the display panel 141 is a part of the user IF 260. Further, as well as a physical switch, a voice input using a microphone, a gesture input using the stereo camera 131, and the like may be incorporated as the user IF 260.

A presentation unit 140 functions as a presentation unit which directly or indirectly presents information on the operation state and the task of the moving robot 100 to the surroundings such as a user, a person present in the surrounding area, and another moving robot, and is disposed in the carriage unit 110 and the main unit 120 in a distributed manner. The display panel 141 and the LED bar 142 are components constituting the presentation unit 140. The presentation unit 140 may also include a speaker, an oscillator, and the like. The control unit 200 operates each of the components by sending a control signal to the presentation unit 140.

A charging unit 270 includes the power receiving terminal 113, a rechargeable battery, and a rechargeable battery circuit. The rechargeable battery is, for example, a nickel metal hydride rechargeable battery. The rechargeable battery includes a charge adjustment circuit for adjusting an input of power supplied from the power receiving terminal 113, a remaining capacity detection circuit for detecting a remaining capacity of the rechargeable battery, and a power supply circuit for supplying power to each component of a driving motor or the like. The control unit 200 sends a control signal to the charge adjustment circuit to control charging, receives a remaining capacity signal from the remaining capacity detection circuit to generate a charging task, and so on.

The control unit 200 functions as a function calculation unit for performing various calculations related to controls. The movement determination unit 201 determines, when it is predicted by the external sensor that another moving robot is positioned at a via point or a destination point of the moving robot 100 at the same time that the own autonomous moving body is, whether to continue or suspend movement by estimating a task of the another moving robot from the operation state thereof. A specific determination method will be described in detail later.

In recent years, there has been a growing demand that a plurality of moving robots be autonomously moved to simultaneously execute various tasks in parallel. For example, in a case where a plurality of moving robots are made to respectively execute tasks different from each other under a controlled environment such as a factory, a system can be constructed, by installing a server for comprehensively managing these moving robots, so that the server controls a movement and an execution of the tasks of each of the moving robots. Even when a comprehensive management is not performed by a server, in a managed environment where people who stay with moving robots are restricted, it is possible to use only moving robots that can communicate with each other by using communication means in conformity with a common format. In this case, the moving robots communicate with each other by using communication means so that they can adjust a movement path and a task execution with each other.

However, the demand for an environment in which a plurality of moving robots execute tasks different from each other has become stronger with each passing year. Examples of places where a plurality of moving robots execute tasks different from each other include an airport, a shopping mall, and a theme park. In such an environment where many people gather, various tasks are given to moving robots, and thus it has become difficult to cover all the tasks only with moving robots controlled under a single system. Further, in addition to the above difficulty, for example, there is little rationality in managing a moving robot that conveys loads and a moving robot that performs cleaning, under a single system. Therefore, a moving robot that smoothly performs a given task without interfering with other moving robots has come to be desired even if such a robot does not belong to a group of moving robots categorized by a single system or common communication means. The moving robot 100 according to this embodiment responds to such a demand.

As described above, the moving robot 100 includes no communication device for communicating with other moving robots. Further, it also includes no communication device for receiving an instruction from a server which comprehensively manages a plurality of moving robots. In the above-described moving robot 100, in order to safely, smoothly and steadily perform a given task, one of the important points is what operation is performed when it is likely to collide with another moving robot at a via point and a destination point. The operation of the moving robot 100 in such a case is described using a specific example.

Figure 3:
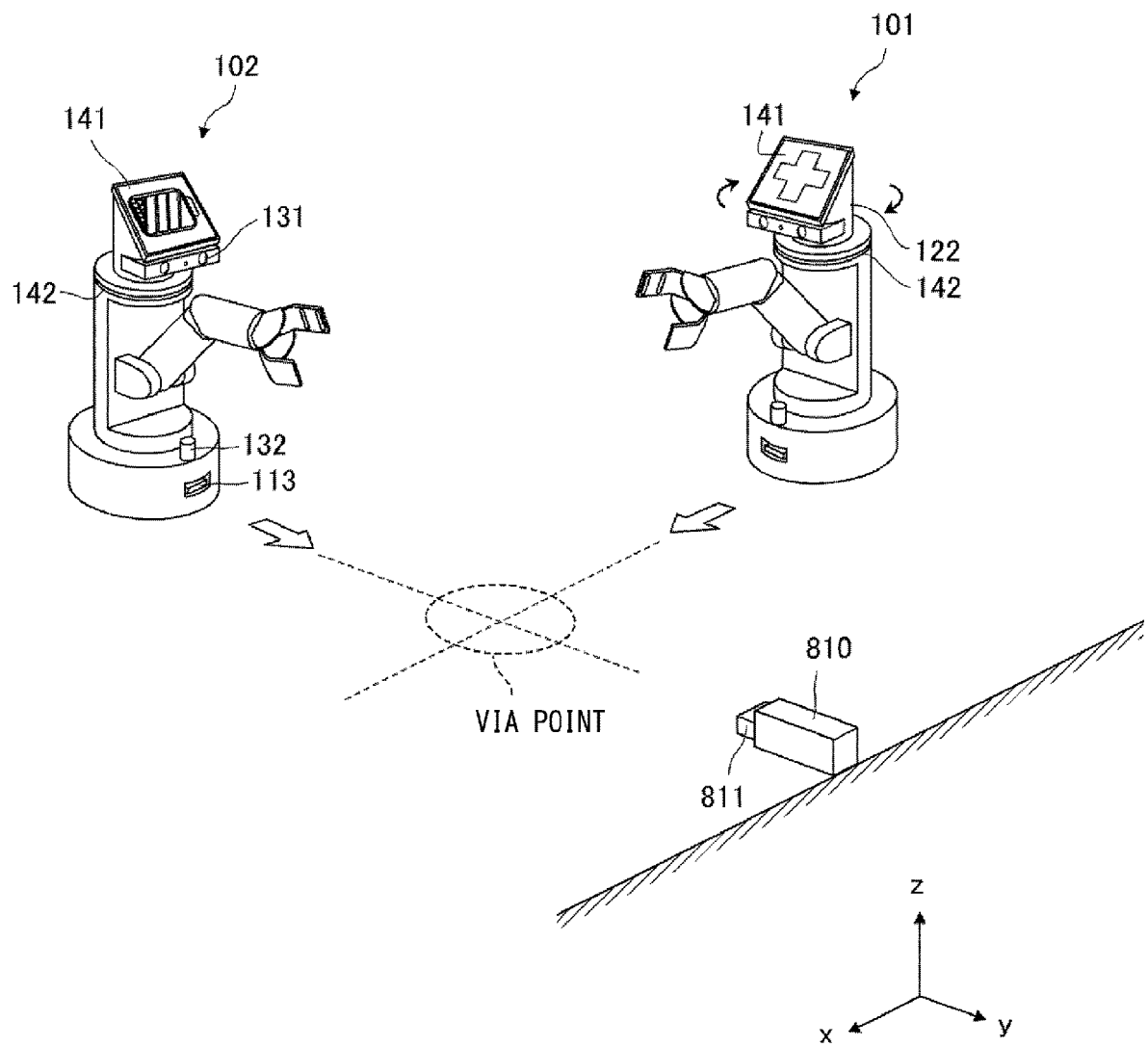
FIG. 3 is a diagram for explaining a state of a movement determination in an example.

FIG. 3 is a diagram for explaining a state of a movement determination in an example. Note that a moving robot 101 is another moving robot executing a task having a high emergency and has the same configuration as that of the above-described moving robot 100. Further, a moving robot 102 is the own moving robot executing a charging task and has also the same configuration as that of the above-described moving robot 100. The moving robots 101 and 102 independently perform each of the tasks thereof, and they do not communicate with each other by using communication means.

The moving robot 101, which is another moving robot, is moving in the x-axis direction. The moving robot 102, which is the own moving robot, is moving in the y-axis direction in order to bring the power receiving terminal 113 provided thereon into contact with a power feed terminal 811 of a power feeding unit 810 provided near a wall surface. The power feeding unit 810 is an example of a feeding point for supplying power to a rechargeable battery of a moving robot, and is a destination point when a charging task is executed.

The moving robot 102 which is the own moving robot moves along a planned movement path toward the power feeding unit 810, and it is planned for it to pass through a via point indicated by a dotted circle at a certain time. The dotted circle roughly indicates an outline of a projection region of the moving robot 102 at the certain time. When the another moving robot 101 moves in the x-axis direction as planned without any change, it intersects the via point of the moving robot 102 at the certain time. That is, if the another moving robot 101 moves as planned and the moving robot 102 which is the own moving robot also moves as planned, they come into contact with each other.

The moving robot 102, which is the own moving robot, autonomously moves while observing an outside situation by using the stereo camera 131 and the laser scanner 132. When the control unit 200 recognizes, during moving autonomously, the moving robot 101 in the forward direction by performing an image analysis of an image captured by the stereo camera 131, the control unit 200 subsequently checks an operation state of the moving robot 101. The operation states to be checked are set as a plurality of items in advance, and the control unit 200 checks the operation state of the moving robot 101 by using an output of the sensor unit 130. The control unit 200 firstly checks a moving direction and a speed of the moving robot 101 as one of the operation states to be checked.

By continuously acquiring image data from the stereo camera 131, the control unit 200 calculates the moving direction and the speed of the moving robot 101 from the difference among the acquired image data. Alternatively, by continuously acquiring outputs of the laser scanner 132, the control unit 200 may calculate the moving direction and the speed of the moving robot 101. The control unit 200 may select which sensor is used to calculate the moving direction and the speed of the moving robot 101 in accordance with the recognized shape, color, and the like of the moving robot 101.

When the control unit 200 recognizes from the calculated moving direction and the speed that the another moving robot 101 is positioned at a via point of the own moving robot (the moving robot 102) at a certain time, the movement determination unit 201 subsequently determines whether to continue or suspend movement. The movement determination unit 201 determines whether to continue or suspend movement based on whether a task estimated from the checked operation state of the moving robot 101 or a task of the own moving robot has a higher priority.

As shown in FIG. 3, the moving robot 101 displays an icon indicating a medical emergency on the display panel 141 and emits light with a pattern light indicating a medical emergency by using the LED bar 142 when a given task is a task of a medical emergency, such as bringing life-saving appliances from a predetermined shelf. Further, the moving robot 101 is rotating the head part 122.

The control unit 200 of the moving robot 102 which is the own moving robot recognizes the above-described display and emitted light, and thereby recognizing that the moving robot 101 is executing an emergency task. Then, the movement determination unit 201 recognizes that the emergency task has a priority higher than that of a charging task which is a task of the own moving robot, and determines to suspend movement. Upon receiving this determination, the control unit 200 controls the carriage drive unit 210 so that the moving robot 102 stops. Note that a priority of the task is stored in advance, for example, in the memory 250 as a lookup table. The lookup table will be described later. As described above, the moving robot 102 which is the own moving robot resumes movement after making the another moving robot 101 executing an emergency task pass by first in order to avoid coming into contact with the another moving robot 101.

The moving robot 102 preferably displays information regarding a charging task such as an icon of a battery as shown in FIG. 3 on the display panel 141 in order to show the own charging task to the another moving robot 101. Further, the LED bar 142 is preferably emitted light with a light-emitting pattern indicating a charging task. Since the moving robot 101 is a moving robot of the same type as that of the moving robot 100, it recognizes the moving robot 102 as another moving robot, estimates a charging task by observing an icon or the like on the display panel 141, and compares whether the own task or the task of the moving robot 102 has a higher priority to continue movement.

Figure 4:
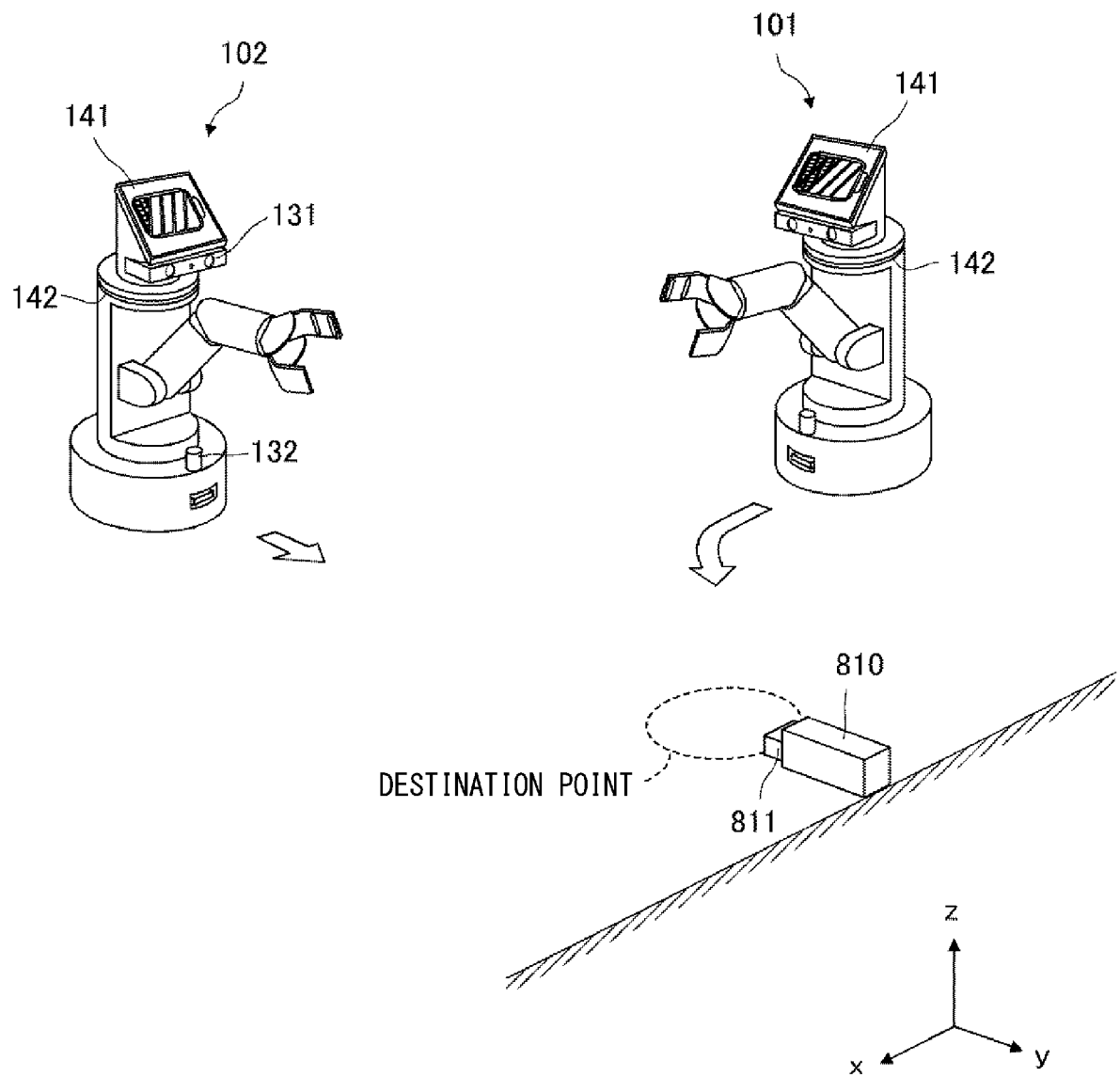
FIG. 4 is a diagram for explaining a state of a movement determination in another example.

FIG. 4 is a diagram for explaining a state of a movement determination in another example. The moving robot 102 which is the own moving robot is executing a charging task in the same manner as that in the example of FIG. 3. In this example, another moving robot 101 is also executing a charging task, and they both are moving toward the power feeding unit 810. That is, if the moving robot 102 which is the own moving robot and the another moving robot 101 have the same destination point indicated by a dotted circle and the another moving robot 101 moves as planned and the moving robot 102 which is the own moving robot also moves as planned, they come into contact with each other.

When the control unit 200 of the moving robot 102 which is the own moving robot recognizes the moving robot 101 from outputs of the stereo camera 131 and the laser scanner 132, it checks a moving direction and a speed of the moving robot 101 and then determines whether or not the moving robot 101 intersects a via point or a destination point of the own moving robot. Since the moving robot 101 displays an icon indicating an execution of a charging task on the display panel 141, the control unit 200 recognizes that the moving robot 101 is executing the charging task by analyzing an image output from the stereo camera 131. The control unit 200 estimates from a moving direction of the moving robot 101 and an task (i.e., a charging task) being executed by the moving robot 101 that the destination point of the moving robot 101 is the power feeding unit 810 and coincides with the destination point of the own moving robot.

When the movement determination unit 201 recognizes that the two tasks of the own moving robot and the moving robot 101 are charging tasks, it determines which of the tasks has the higher priority by performing a priority determination in the case where the same task is executed. When the two tasks of the moving robots are the same charging tasks, "a priority for charging" which is a circumstance in which charging should be performed in a hurry is taken into consideration. For example, a priority of a task is determined by a remaining capacity of a rechargeable battery mounted on each of the moving robots.

As shown in FIG. 4, the icon of the battery displayed on the display panel 141 indicates a remaining capacity of the mounted rechargeable battery by filling a segment. In FIG. 4, the remaining capacity is high as the number of filled segments increases. According to FIG. 4, since two segments out of five segments of the battery icon of the moving robot 101 are filled, the remaining capacity of the rechargeable battery thereof is one-fifth or more and less than two-fifths with respect to a full charge. On the other hand, the remaining capacity of the moving robot 102 is less than one-fifth with respect to a full charge since the number of filled segments of the icon is one.

The control unit 200 recognizes from the image output from the stereo camera 131 that the remaining capacity of the rechargeable battery of the moving robot 101 is one-fifth or more and less than two-fifths. The movement determination unit 201 determines that the own moving robot should charge the battery in a hurry in view of the fact that the remaining capacity of the rechargeable battery of the own moving robot is one-fifth with respect to a full charge and that the charging task of the own moving robot has a higher priority than that of the moving robot 101. That is, the movement determination unit 201 determines to continue movement toward the power feeding unit 810 which is the destination point. Upon receiving this determination, the control unit 200 controls the carriage drive unit 210 so that the moving robot 102 continues movement. Note that remaining capacity information of the rechargeable battery may be presented by the presentation unit 140 using forms other than the above-described icon form without any limitation. Further, other information may also be presented simultaneously.

Figure 5:
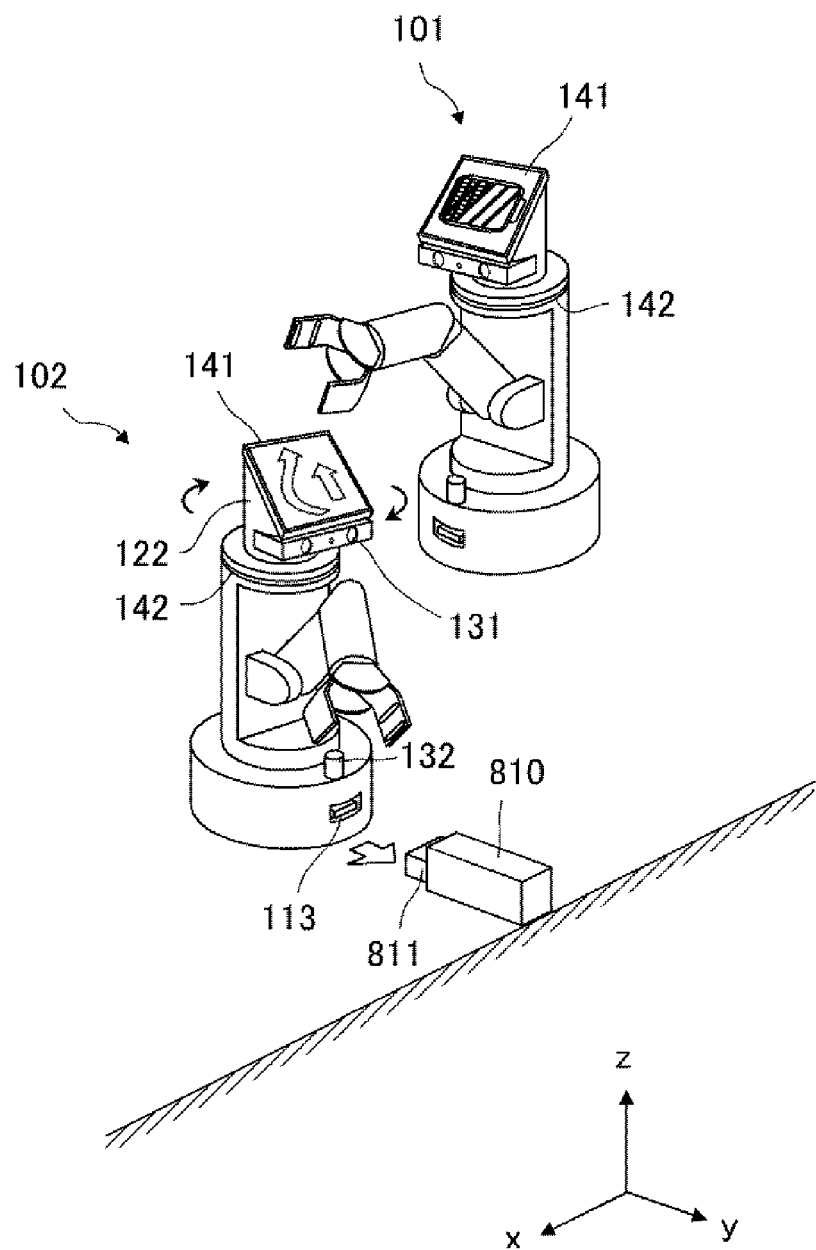
FIG. 5 is a diagram for explaining a state of moving on a priority basis.

FIG. 5 is a diagram for explaining a state where the moving robot 102 which is the own moving robot moves on a priority basis. During moving on a priority basis, the control unit 200 controls the display panel 141 display icons and letters indicating to the surroundings that a priority operation is in progress. At this time, the control unit 200 may send a control signal to the upper body drive unit 220 to rotate the head part 122 so that surrounding people and moving robots can recognize it easily. Further, the control unit 200 controls the LED bar 142 emit light with a light-emitting pattern indicating that the priority operation is in progress.

By such a presentation by the moving robot 102, the moving robot 101 which suspends movement can recognize that the other party is performing a priority operation as long as it is a moving robot of the same type as that of the moving robot 102 even when neither of them includes communication devices for communication. That is, it is possible to recognize the priority operation of the moving robot 102 by capturing a display on the display panel 141 and the light-emitting pattern of the LED bar 142 of the moving robot 102 using the stereo camera 131. The moving robot 101 moves to the power feeding unit 810 to start charging after the moving robot 102 has completed charging and has left the power feeding unit 810.

FIG. 6 is an example of a lookup table of a task priority. In the lookup table of the task priority, a priority order is determined for tasks that can be given by a user to respective moving robots autonomously moving under an environment shared with each other or that moving robots can generate voluntarily. Note that as tasks, an "emergency traveling", a "calling command", a "guiding traveling", a "charge", an "object conveyance", and a "returning" are provided, and it is determined that the priority order is a descending one. The "emergency traveling" is a task including an "emergency task" which is a task of the moving robot 101 in the example of FIG. 3. The "calling command" is a task of moving a moving robot to a calling point when the moving robot is called by a user or the like. The "guiding traveling" is a task of guiding a user. The "returning" is a task of returning the moving robot to a holding area. The types of these tasks are appropriately changed according to roles of moving robots. Further, the priority order can also be changed according to a philosophy for designing a system.

The movement determination unit 201 compares the priority order of the task of the own moving robot with that of another moving robot, and determines that movement is continued when the task of the own moving robot has a higher priority than that of the another moving robot, and that movement is suspended when the task of the own moving robot has a lower priority than that of the another moving robot. When the priority orders are the same, a priority determination in the case of the two moving robots executing the same task is taken into consideration. The priority determination in the case of the two moving robots executing the same task is determined for each task in advance, as is a remaining capacity in the example of a charging task in FIG. 4. In the case of the "emergency traveling", a priority is given to a moving robot the moving speed of which is higher than that of another moving robot, and in the case of the "calling command", a higher priority is given to a moving robot called by a system administrator than that called by a general user. In the case of the "guiding traveling", a priority is given to a moving robot guiding a larger number of people than that guided by another moving robot, and in the case of the "object conveyance", a priority is given to a moving robot conveying a larger object than that of another moving robot. In the case of the "returning", a priority is given to a moving robot having a larger number of tasks to be executed after it has returned than that of another moving robot. It can be appropriately set which task should have the higher priority when the tasks are the same according to roles or usage environments of moving robots.

Figure 7:
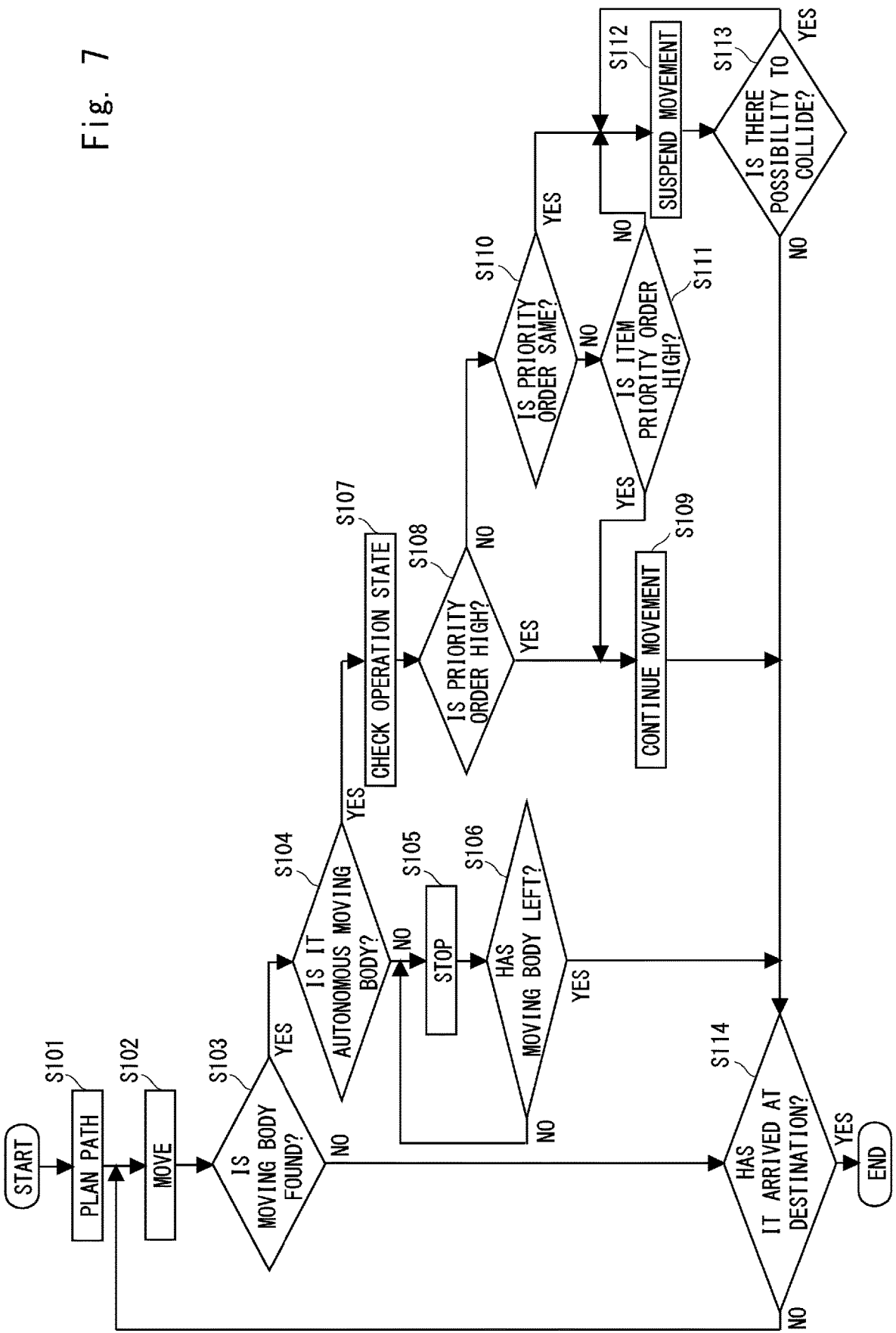
FIG. 7 is a flowchart showing a process flow regarding movement of the moving robot.

Next, a process flow regarding movement of the moving robot 100 is described. FIG. 7 is a flowchart showing the process flow regarding the movement of the moving robot 100. The flow starts when a task is given and ends with the arrival of the moving robot 100 at the destination.

In Step S101, the control unit 200 plans a movement path for movement required to execute a task. Planning for the movement path is performed with reference to, for example, an environmental map stored in the memory 250. For example, since a user designates a conveyance destination when it is a task of conveying a conveying object, the control unit 200 plans the movement path from the current location to the conveyance destination with reference to the environmental map. The current location is recognized by, for example, an output from a GPS unit which is mounted on the moving robot 100 as the sensor unit 130.

In Step S102, the control unit 200 controls the carriage drive unit 210 so that the own moving robot moves along the planned movement path. The control unit 200 continuously acquires output signals and output data from the sensor unit 130 during the movement of the own moving robot to monitor whether or not there is an obstacle or a moving body is approaching. When an obstacle is found, the control unit 200 generates an avoidance path to avoid the obstacle. In Step S103, the control unit 200 recognizes whether or not there is another moving body which is predicted to be positioned at a via point or a destination point at the same time that the own autonomous moving body is with respect to a movement path of the own moving robot. When there is no another moving body, the process proceeds to Step S114, and when there is another moving body, the process proceeds to Step S104.

In Step S104, the control unit 200 determines whether or not the found moving body is an autonomous moving body. If the control unit 200 determines that the found moving body is not an autonomous moving body, it stops the movement of the own moving robot in Step S105 in order to give a priority to a movement of the found target including the case where the target is a person. Then, the own moving robot waits while maintaining itself at a standstill until it is possible to determine in Step S106 that the target moving body has left. When it is possible to determine that the moving body has left, the process proceeds to Step S114.

When the control unit 200 determines that the found moving body is an autonomous moving body in Step S104, the process proceeds to Step S107 and then the control unit 200 checks an operation state of the determined autonomous moving body. The control unit 200 estimates a task of the autonomous moving body from a result of recognizing the operation state thereof. Then, in Step S 108, the movement determination unit 201 compares priority orders between the estimated task and the task of the own moving robot. When the priority order of the task of the own moving robot is higher than that of the estimated task, the movement determination unit 201 determines to continue movement and the process proceeds to Step S109. In Step S109, the control unit 200 controls the carriage drive unit 210 so that the moving robot 100 continues movement, and the process proceeds to Step S114.

In Step S108, when the priority order of the task of the own moving robot is not higher than that of the estimated task, the process proceeds to Step S110 and then the movement determination unit 201 checks whether or not the priority orders of them are the same. When they are the same, the process proceeds to Step S111, and when they are not the same, the movement determination unit 201 determines to suspend movement and the process proceeds to Step S112.

When the process proceeds to Step S111, the movement determination unit 201 determines that the two tasks are the same and then checks items to be checked for the priority determination set for the tasks. Then, a priority determination of them with respect to the items is performed. When a priority of the own moving robot is higher than that of another moving robot, the process proceeds to Step S109, and when a priority of the own moving robot is lower than that of another moving robot, the process proceeds to Step S112.

In Step S112, the control unit 200 controls the carriage drive unit 210 so that the moving robot 100 suspends movement. That is, the control unit 200 stops the moving robot 100. The control unit 200 continues observation of the found autonomous moving body even while movement is suspended. Then, in Step 113, the control unit 200 determines whether or not there is a possibility to collide with the autonomous moving body when the own moving robot resumes movement. If it is determined that there is a possibility of a collision, the own moving robot continues the suspension of movement and waits. If it is determined that there is no possibility of a collision, the process proceeds to Step S114.

In Step S114, the control unit 200 checks whether or not the own moving robot has arrived at the destination. When the own moving robot has not yet arrived at the destination, the process returns to Step S102 and the movement control is continued. When it has arrived at the destination, the series of the movement controls are ended.

Note that when the own moving robot continues movement (when the process proceeds to Step S109) as a result of a comparison of task priorities, the moving robot 100 which is the own moving robot preferably suspends movement or leaves the movement path in order to avoid a contact in the case where another autonomous moving body is approaching without suspending movement. Further, in Step S107, when it is not possible to estimate a task of another approaching autonomous moving body, the process may skip to Step S112.

Figure 8:
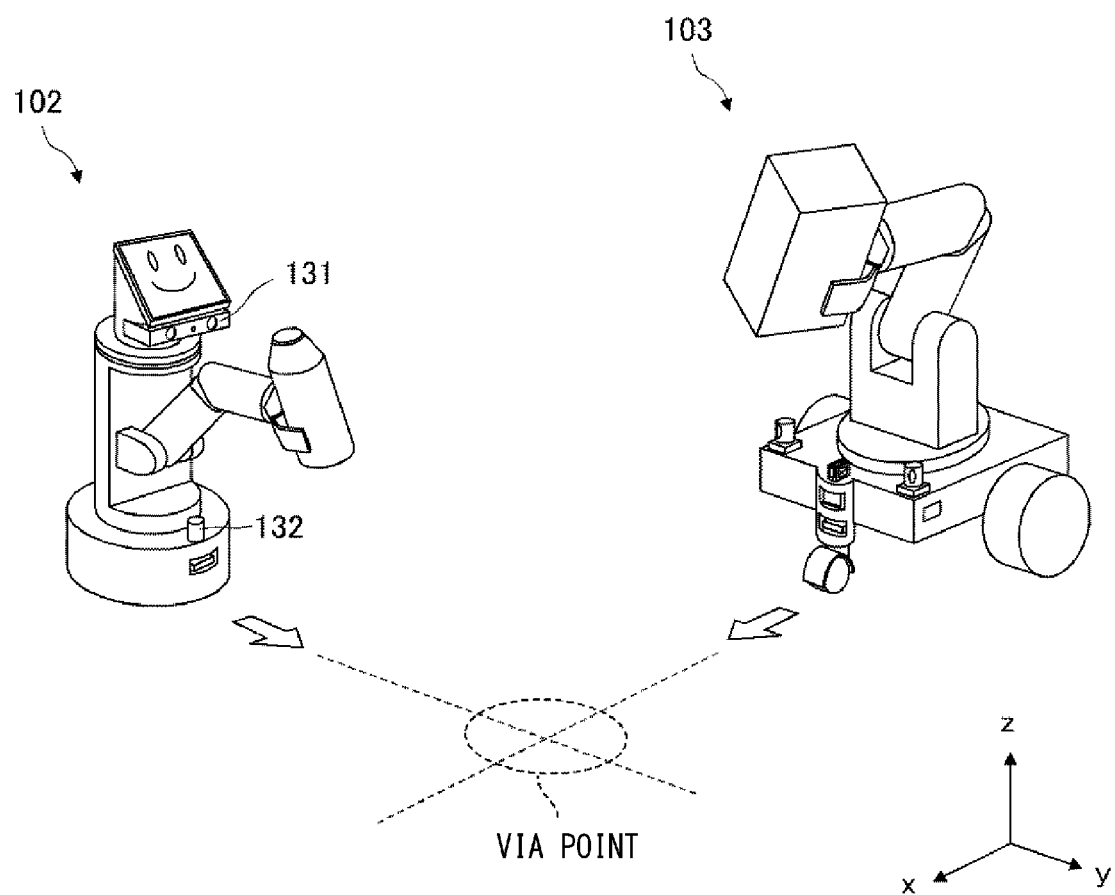
FIG. 8 is a diagram for explaining a state of a movement determination in another example.

Next, a movement determination in another example is described. FIG. 8 is a diagram for explaining a state of the movement determination in another example. The state in FIG. 8 is different from the above-described state in that another approaching moving robot 103 is an autonomous moving body of a type different from that of the moving robot 102 which is the own moving robot. The moving robot 103 has a property different from that of the moving robot 102, and a task in accordance with the property is given to the moving robot 103. Obviously, a user who gives a task to the moving robot 103 can be different from the user of the moving robot 102.

Under such a situation, when the control unit 200 predicts that the own moving robot intersects the moving robot 103 at a via point indicated by a dotted circle, the movement determination unit 201 determines to suspend movement. When the target is an autonomous moving body of a type different from the own moving robot, it is sometimes difficult to accurately recognize the operation state based on external-appearance information acquired by the sensor unit 130. Therefore, by suspending the movement operation as described above, a high level of safety can be achieved. However, even when it is an autonomous moving body of a type different from the own moving robot, in the case where the operation state can accurately be recognized based on the external-appearance information and thus the task can be estimated, the movement determination unit 201 may determine to continue movement.

Although this embodiment has been described above by using the moving robot 100 including no communication device, moving robots which can perform this embodiment are not limited to those including no communication device. For example, a plurality of moving robots belonging to one group of moving robots may respectively adjust movements thereof by communication using a communication device, and may perform the above-described control when recognizing other moving robots which do not belong to any group of moving robots. Alternatively, while intercommunication with other moving robots is established, the movement control may be performed based on a communication result of the intercommunication regardless of the determination of the overtaking determination unit 201, and when the intercommunication is not established, the movement control may be performed based on the determination of the overtaking determination unit 201. When communication with other moving robots is performed through a communication device, a server may be used. In this case, the server may control the communication autonomously.

The program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. An autonomous moving body configured to move along a planned movement path, the autonomous moving body comprising:
   a display configured to visually display a charging status of the autonomous moving body;
   a camera configured to capture an image of a charging status on a display of another autonomous moving body, wherein the another autonomous moving body and the autonomous moving body are not capable of communicating with each other via wireless radio communication, and wherein the another autonomous moving body and the autonomous moving body are not capable of communicating with a central server via wireless radio communication;
   a processor programmed to:
      determine whether the another autonomous moving body is: (a) positioned at a via-point, or (b) moving towards a destination point of the autonomous moving body at a same time of the autonomous moving body,
      determine a charging status of the another autonomous based on the display of the another autonomous body as captured by the camera,
      determine whether the charging status of the another autonomous moving body has a higher priority as compared to a charging status of the autonomous moving body,
      determine an action of whether to continue or suspend movement based on whether the charging status of the another autonomous moving body has the higher priority as compared to the charging status of the autonomous moving body; and
      control a movement of the autonomous moving body based on the determined action.

2. The autonomous moving body according to claim 1, wherein the processor is programmed to present information on a task of the autonomous moving body to the another autonomous moving body by visually displaying information on the display.

3. The autonomous moving body according to claim 1, wherein the processor is programmed to suspend movement when it is recognized that the another autonomous moving body is not an autonomous moving body of the same type as that of the autonomous moving body.

* * * * *